(12) United States Patent
Yamada

(10) Patent No.: US 9,825,566 B2
(45) Date of Patent: Nov. 21, 2017

(54) MOTOR CONTROL APPARATUS

(71) Applicant: DENSO CORPORATION, Kariya, Aichi-pref. (JP)

(72) Inventor: Jun Yamada, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 15/371,736

(22) Filed: Dec. 7, 2016

(65) Prior Publication Data

US 2017/0163187 A1 Jun. 8, 2017

(30) Foreign Application Priority Data

Dec. 8, 2015 (JP) ................................. 2015-239459

(51) Int. Cl.
*G05B 5/00* (2006.01)
*H02P 6/24* (2006.01)
*H02P 6/15* (2016.01)

(52) U.S. Cl.
CPC ................. *H02P 6/24* (2013.01); *H02P 6/153* (2016.02)

(58) Field of Classification Search
CPC ........... E05Y 2900/55; E05Y 2900/106; E05F 15/1607; E05F 15/0004; B60J 7/0573; H02P 6/16; H02P 6/003; F16H 61/32; F16H 61/12
USPC ....... 318/400.37, 400.4, 461, 449, 466, 468, 318/286
See application file for complete search history.

(56) References Cited

U.S. PATENT DOCUMENTS

| | | | | |
|---|---|---|---|---|
| 6,105,448 A | * | 8/2000 | Borschert | F16H 61/12 74/335 |
| 6,477,910 B2 | * | 11/2002 | Ebashi | F16H 61/32 74/335 |
| 7,161,314 B2 | * | 1/2007 | Nakai | H02P 6/24 318/400.4 |
| 7,713,168 B2 | * | 5/2010 | Shinojima | F16H 61/12 477/111 |
| 8,072,168 B2 | * | 12/2011 | Kimura | F02N 19/005 318/445 |
| 8,370,035 B2 | * | 2/2013 | Ding | F16H 61/32 180/443 |
| 2004/0066166 A1 | | 4/2004 | Nakai et al. | |
| 2006/0006827 A1 | | 1/2006 | Nakai et al. | |

(Continued)

OTHER PUBLICATIONS

U.S. Appl. No. 15/237,907, filed Aug. 16, 2016, Yoshida et al. (27 pages).

*Primary Examiner* — Rina Duda
(74) *Attorney, Agent, or Firm* — Nixon & Vanderhye PC

(57) ABSTRACT

A control circuit of a motor control apparatus includes a shift range switchover control part for rotationally driving a rotor of the motor to a target position, which corresponds to a target shift range, a wall-hitting control part for rotating the rotor until the driven body hits one of limit positions of a movable range of the driven body at a speed lower than that of the rotor controlled by the shift range switchover control part, and a speed check part for checking whether a rotation speed of the rotor is within a predetermined speed range, when the rotor is rotated by the wall-hitting control part. The wall-hitting control part limits a power supply angular interval to be smaller when the rotation speed of the rotor is within the predetermined speed range than when the rotation speed of the rotor is lower than the predetermined speed range.

15 Claims, 6 Drawing Sheets

(56) References Cited

U.S. PATENT DOCUMENTS

2006/0207373 A1 9/2006 Amamiya et al.
2008/0168853 A1 7/2008 Amamiya et al.
2008/0210033 A1 9/2008 Amamiya et al.

* cited by examiner

NORMAL POWER SUPPLY MAP

| PATTERN | A0 | A1 | A2 | A3 | A4 | A5 | A6 | A7 | A8 | A9 | A10 | A11 |
|---|---|---|---|---|---|---|---|---|---|---|---|---|
| U-PHASE |  |  |  |  | O | O | O | O | O | O |  |  |
| V-PHASE | O | O |  |  |  |  |  |  | O | O | O | O |
| W-PHASE | O | O | O | O | O | O |  |  |  |  |  |  |

POWER SUPPLY LIMITATION MAP

| PATTERN | B0 | B1 | B2 | B3 | B4 | B5 | B6 | B7 | B8 | B9 | B10 | B11 |
|---|---|---|---|---|---|---|---|---|---|---|---|---|
| U-PHASE |  |  |  |  | O | O |  |  | O | O |  |  |
| V-PHASE | O | O |  |  |  |  |  |  | O | O |  |  |
| W-PHASE | O | O |  |  | O | O |  |  |  |  |  |  |

FIG. 8

POWER SUPPLY LIMITATION MAP

| PATTERN | C0 | C1 | C2 | C3 | C4 | C5 | C6 | C7 | C8 | C9 | C10 | C11 |
|---|---|---|---|---|---|---|---|---|---|---|---|---|
| U-PHASE |  |  |  |  |  |  | ○ | ○ |  |  |  |  |
| V-PHASE |  |  |  |  |  |  |  |  |  |  | ○ | ○ |
| W-PHASE |  |  | ○ | ○ |  |  |  |  |  |  |  |  |

FIG. 9

POWER SUPPLY LIMITATION MAP

| PATTERN | D0 | D1 | D2 | D3 | D4 | D5 | D6 | D7 | D8 | D9 | D10 | D11 |
|---|---|---|---|---|---|---|---|---|---|---|---|---|
| U-PHASE |  |  |  |  |  |  | ○ | ○ |  |  |  |  |
| V-PHASE |  |  |  |  |  |  |  |  |  |  |  |  |
| W-PHASE |  |  |  |  |  |  |  |  |  |  |  |  |

FIG. 10

POWER SUPPLY LIMITATION MAP

| PATTERN | E0 | E1 | E2 | E3 | E4 | E5 | E6 | E7 | E8 | E9 | E10 | E11 |
|---|---|---|---|---|---|---|---|---|---|---|---|---|
| U-PHASE |  |  |  |  | ○ | ○ |  |  |  |  |  |  |
| V-PHASE |  |  |  |  |  |  |  |  |  |  |  |  |
| W-PHASE |  |  |  |  | ○ | ○ |  |  |  |  |  |  |

FIG. 11

POWER SUPPLY LIMITATION MAP

| PATTERN | F0 | F1 | F2 | F3 | F4 | F5 | F6 | F7 | F8 | F9 | F10 | F11 |
|---|---|---|---|---|---|---|---|---|---|---|---|---|
| U-PHASE |  |  |  |  |  |  |  |  |  |  |  |  |
| V-PHASE |  |  |  |  |  |  |  |  |  |  |  |  |
| W-PHASE |  |  |  |  |  |  |  |  |  |  |  |  |

FIG. 12

NORMAL POWER SUPPLY MAP

| PATTERN | G0 | G1 | G2 | G3 | G4 | G5 | G6 | G7 | G8 | G9 | G10 | G11 |
|---|---|---|---|---|---|---|---|---|---|---|---|---|
| U-PHASE |  |  |  | O | O | O | O | O | O | O | O |  |
| V-PHASE | O | O | O |  |  |  |  | O | O | O | O | O |
| W-PHASE | O | O | O | O | O | O | O |  |  |  |  | O |

FIG. 13

NORMAL POWER SUPPLY MAP

| PATTERN | H0 | H1 | H2 | H3 | H4 | H5 | H6 | H7 | H8 | H9 | H10 | H11 |
|---|---|---|---|---|---|---|---|---|---|---|---|---|
| U-PHASE |  |  |  |  |  | O | O | O | O |  |  |  |
| V-PHASE | O |  |  |  |  |  |  |  |  | O | O | O |
| W-PHASE |  | O | O | O | O |  |  |  |  |  |  |  |

MOTOR CONTROL APPARATUS

CROSS REFERENCE TO RELATED APPLICATION

This application is based on Japanese patent application No. 2015-239459 filed on Dec. 8, 2015, the whole contents of which are incorporated herein by reference.

FIELD

The present disclosure relates to a motor control apparatus.

BACKGROUND

A conventional motor control apparatus rotates a rotor of a motor to a target position by switching over a power supply phase of the motor based on an output signal of an encoder. JP 2004-129452A (US 2006/0006827A1, US 2004/0066166A1) discloses a motor control apparatus for rotationally driving a detent plate, which is a driven body of a shift range switchover mechanism of an automatic transmission of a vehicle, by controlling a motor of a shift-by-wire system. This motor control apparatus performs a phase lead control for applying a braking force to a rotor of the motor by correcting a phase lead amount of a power supply phase relative to a rotation phase of the rotor in accordance with a rotation speed of the rotor, when a shift range of the transmission is switched over.

The motor control apparatus performs a wall-hitting control to determine a relative positional relation of the rotor of the motor and the detent plate at such time as, for example, immediately after power-on time. Specifically, the motor control apparatus rotates the rotor until the detent plate hits against one of limit positions of its movable range and learns the rotation position of the rotor as a reference position when the rotor is stopped at the limit position. In performing the wall-hitting control, hitting impact generated when the detent plate hits against the limit position exerts on a rotation transfer part, which is between the motor and the detent plate. In a case that the rotation transfer part is twisted at time of strong hitting of the detent plate against the limit position, the reference position is not learned correctly and hence the rotation position is not controlled with high precision.

It is possible to reduce the hitting impact by decreasing inertia of the rotation transfer part between the rotor and the detent plate, by lowering a motor rotation speed at the wall-hitting control time relative to that of a shift range switchover time. In a case that a phase-lead correction control is performed under a low motor rotation speed condition, the phase lead amount is decreased when the motor rotation speed exceeds a target rotation speed. Thus, relatively large braking force is generated and the motor is likely to be stopped from rotating. As a result, such a stop position is likely to be learned as the reference position although the wall-hitting operation has not been completed. In this case, the rotation position of the detent plate cannot be controlled with high precision.

SUMMARY

It is an object to provide a motor control apparatus, which is capable of reducing a load applied to a rotation transfer part, which is present between a motor and a driven body, without lowering precision of a rotation position control for the driven body of a shift range switchover mechanism.

A motor control apparatus rotationally drives a driven body of a shift range switchover mechanism by controlling a motor provided as a drive power source of a shift-by-wire system. The motor control apparatus comprises a shift range switchover control part for rotationally driving a rotor of the motor to a target position, which corresponds to a target shift range, a wall-hitting control part for rotating the rotor until the driven body hits one of limit positions of a movable range of the driven body at a speed lower than that of the rotor controlled by the shift range switchover control part, and a speed check part for checking whether a rotation speed of the rotor is within a predetermined speed range, when the rotor is rotated by the wall-hitting control part. The wall-hitting control part limits a power supply angular interval to be smaller when the rotation speed of the rotor is within the predetermined speed range than when the rotation speed of the rotor is lower than the predetermined speed range, the power supply angular interval being an angular interval of power supply to the motor in one complete cycle of power supply patterns performed to rotate the rotor.

BRIEF DESCRIPTION OF THE DRAWINGS

FIG. 8 is a table showing a power supply limitation map, which is used by the control part of the motor control apparatus in second and ninth embodiments;

FIG. 9 is a table showing a power supply limitation map, which is used by the control part of the motor control apparatus in third and tenth embodiments;

FIG. 10 is a table showing a power supply limitation map, which is used by the control part of the motor control apparatus in fourth and seventh embodiments;

FIG. 11 is a table showing a power supply limitation map, which is used by the control part of the motor control apparatus in fifth, eighth and eleventh embodiments;

FIG. 12 is a table showing a normal power supply map, which is used by the control part of the motor control apparatus of the present disclosure in sixth, seventh and eighth embodiments; and FIG. 13 is a table showing a normal power supply map, which is used by the control part of the motor control apparatus shown in FIG. 1.

DETAILED DESCRIPTION OF EMBODIMENTS

Figure 1:
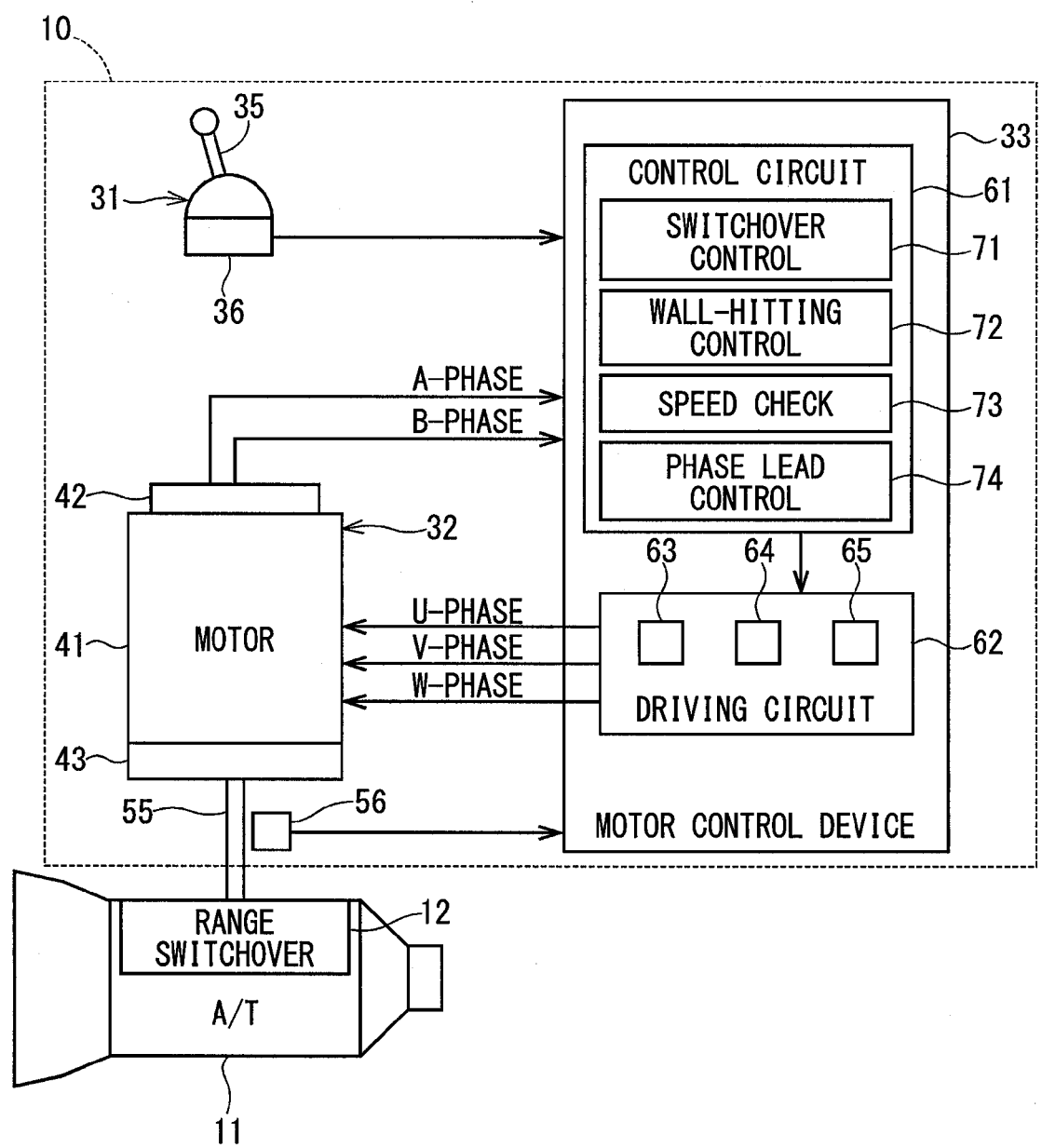
FIG. 1 is a schematic diagram of a shift-by-wire system, which includes a motor control apparatus according to a first embodiment.

A motor control apparatus will be described with reference to plural embodiments shown in the drawings. The motor control apparatus is implemented in a shift-by-wire system of a vehicle. Substantially same structures among the plural embodiments are designated with same reference numerals for simplification of description.

[First Embodiment]

As shown in FIG. 1, a shift-by-wire system 10 is provided to operate a shift range switchover mechanism 12 mounted in an automatic transmission (A/T) 11 of a vehicle.

(Shift Range Switchover Mechanism)

Figure 2:
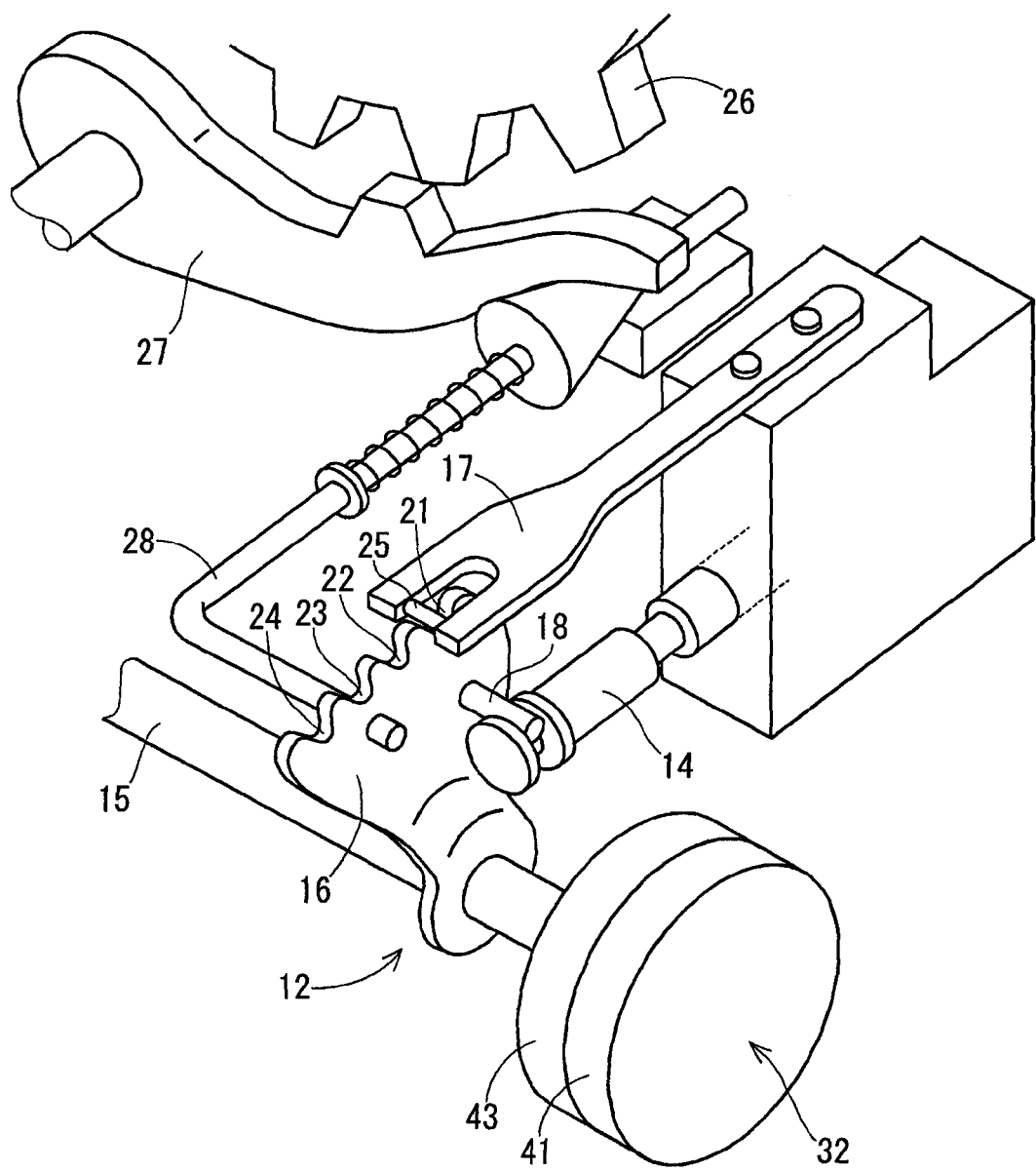
FIG. 2 is a perspective view of a range switchover mechanism of an automatic transmission shown in FIG. 1.

The shift range switchover mechanism 12 will be described first with reference to FIG. 2. The shift range switchover mechanism 12 is provided to switch over a shift range of the automatic transmission 11 by changing an operation position of a range switchover valve 14, which is provided in a hydraulic pressure control circuit of the automatic transmission 11. The shift range switchover mechanism 12 is provided with a control rod 15, a detent plate 16, which is fan-shaped, and a leaf spring 17.

The control rod 15 is coupled to a rotary actuator 32 of the shift-by-wire system 10. The detent plate 16 is fixed to the control rod 15 and rotates integrally with the control rod 15. A part of a rotary motion of the detent plate 16, that is, an axial component, is transmitted to the spool of the range switchover valve 14 through a pin 18. A recess part 21, a recess part 22, a recess part 23 and a recess part 24 are formed on an outer peripheral part of the detent plate 16 in the above-described order from one side of the direction of rotation.

The leaf spring 17 is fixed to a fixing member of the automatic transmission 11 at its one end. The leaf spring 17 has an engagement part 25 at its other end. The engagement part 25 is engageable with the outer peripheral part of the detent plate 16. The operation positions of the range switchover valve 14 are held when the engagement part 25 fits in the recess parts 21 to 24, respectively. A parking range (P) corresponds to the position, at which the engagement part 25 fits in the recess part 21. A reverse range (R) corresponds to the position, at which the engagement part 25 fits in the recess part 22. A neutral range (N) corresponds to the position, at which the engagement part 25 fits in the recess part 23. A drive range (D) corresponds to the position, at which the engagement part 25 fits in the recess part 24.

The range switchover mechanism 12 is further provided with a parking gear 26, a parking pawl 27 and a parking rod 28. The parking gear 26 rotates integrally with an output shaft of the automatic transmission 11. The parking pawl 27 is provided to be able to approach and leave the parking gear 26. When the parking pawl 27 approaches and engages the parking gear 26, it restricts a rotation of the parking gear 26 and locks the output shaft of the automatic transmission 11. In the parking range, the parking rod 28 drives the parking pawl 27 to approach the parking gear 26. In shift ranges other than the parking range, the parking rod 28 drives the parking pawl 27 to leave the gear 26.

(Shift-By-Wire System)

Figure 3:
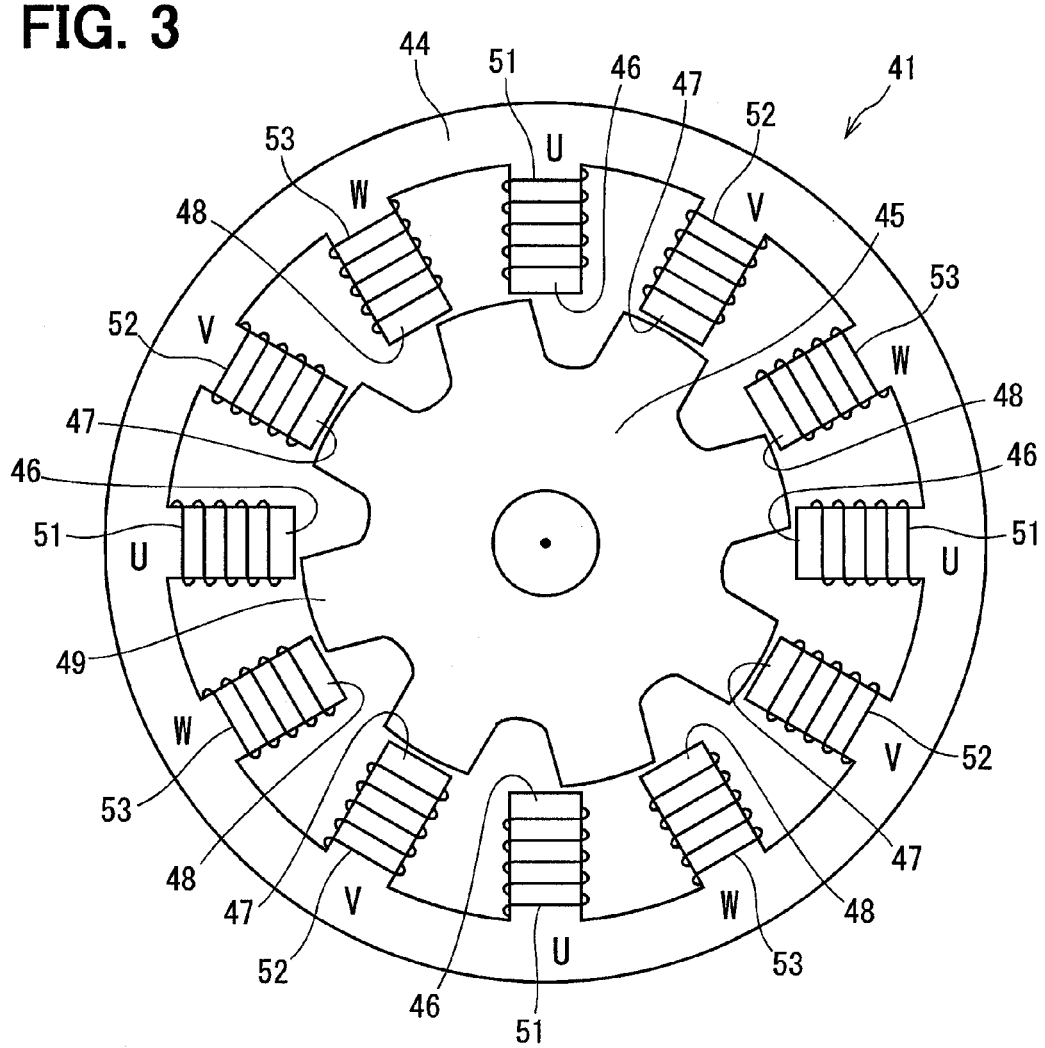
FIG. 3 is a schematic structural view of a motor shown in FIG. 1.

The shift-by-wire system 10 will be described next with reference to FIG. 1 and FIG. 3. As shown in FIG. 1, the shift-by-wire system 10 is provided with a shift manipulation device 31, a rotary actuator 32 and a motor control apparatus 33. The shift manipulation device 31 is provided with a shift lever 35, which a driver manipulates, and a shift position sensor 36, which detects a manipulation position of the shift lever 35. The shift position sensor 36 outputs a signal, which corresponds to the manipulation position of the shift lever 35, to the motor control apparatus 33.

The rotary actuator 32 is provided with a motor 41, an encoder 42 and a reduction device 43, which outputs the rotation of the motor 41 after speed reduction. As shown in FIG. 3, the motor 41 is a switched reluctance motor, in which a stator core 44 and a rotor 45 have salient poles, respectively. On an inner peripheral part of the stator core 44, twelve salient poles 46, 47 and 48, for example, are formed equi-angularly. On an outer peripheral part of the rotor 45, eight salient poles 49, for example, are formed equi-angularly. With the rotation of the rotor 45, each salient pole 49 sequentially faces the salient poles 46, 47 and 48 through a small gap. A U-phase coil 51, a V-phase coil 52 and a W-phase coil 53 are wound about the salient poles 46, 47 and 48, respectively. With switchover of the power supply phase, the rotor 45 is magnetically attracted to a rotary magnetic field generated by switching over the power supply phase.

Referring again to FIG. 1, the encoder 42 is formed of, for example, a magnetic rotary encoder and outputs pulse signals of A-phase and B-phase in synchronization with the rotation of the rotor 45 of the motor 41. An output shaft sensor 56 is provided on an output shaft 55 of the rotary actuator 32. The output shaft sensor 56 detects a rotation angle of the output shaft 55. The output shaft sensor 56 outputs the signal, which corresponds to the rotation angle of the output shaft 55, to the motor control apparatus 33. The rotation angle of the output shaft 55 is used to confirm the present shift range.

The motor control apparatus 33 is provided with a control circuit 61 and a driving circuit 62. The control circuit 61 counts a rising edge and a falling edge of each of an A-phase pulse signal and a B-phase pulse signal, which are outputted from the encoder 42. The control circuit 61 determines the power supply phase of the motor 41 based on its count value (referred to as encoder count value) and commands it to the driving circuit 62. The driving circuit 62 is provided with switching elements 63, 64 and 65, each of which switches over in correspondence to commands from the control circuit 61. The driving circuit 62 rotationally drives the rotor 45 by switching over a power supply state to either one of a one-phase power supply state, in which a current is supplied to either one of the coils 51, 52 and 53, a two-phase power supply state, in which currents are supplied to either two of the coils 51, 52 and 53, and no-power supply state, in which no current is supplied to any one of the coils 51, 52 and 53.

(Motor Control Apparatus)

The control circuit 61 of the motor control apparatus 33 will be described in detail next with reference to FIG. 1 and FIG. 4 to FIG. 6. As shown in FIG. 1, the control circuit 61 includes a shift range switchover control part 71, a wall-hitting control part 72, a speed check part 73 and a phase lead control part 74.

The shift range switchover control part 71 performs a shift range switchover control for rotating the rotor 58 of the motor 41 to a target position, which corresponds to a target shift range, in response to a shift range switchover command. The shift range switchover control includes an acceleration control, a normal rotation control and an deceleration control. The acceleration control is for accelerating the rotation speed of the rotor 58 to a target rotation speed. The normal rotation control is for maintaining the rotation speed of the rotor 58 at the target rotation speed. The deceleration control is for decelerating the rotation speed of the rotor 58 from near the target position. In the first embodiment, the target rotation speed of the rotor 58 at the shift range switchover time is set to about 2,500 rpm.

For determining a relative positional relation between the rotor 58 of the motor 41 and the detent plate 16, the wall-hitting control part 72 performs a wall-hitting control. Specifically, the wall-hitting control part 72 rotates the rotor 58 until the detent plate 16 hits one of the limit positions in its movable range and learns the rotation position of the rotor 58 as a reference position when the rotor 58 stops its rotation. At this time, the wall-hitting control part 72 rotates the rotor 58 at a low speed, which is lower than when the rotor 58 is controlled by the shift range switchover control part 71. In the first embodiment, the target rotation speed of the rotor 58 at the time of wall-hitting control time is set to 300 rpm, for example.

The speed check part 73 checks whether the rotation speed of the rotor 58 is within a predetermined speed range when the rotor 58 is rotated under control of the wall-hitting control part 72. That is, the speed check part 73 checks whether the rotation speed of the rotor 58 is lower than a lower limit value of the predetermined speed range, between the lower limit value and an upper limit value of the predetermined speed range or higher than the upper limit value of the predetermined speed range.

The predetermined speed range is preset as a speed range, in which the rotation speed of the rotor 58 is suppressed from varying. The lower limit value of the predetermined speed range is set to be equal to or lower than the target rotation speed of the rotor or near the target rotation speed. In the first embodiment, the lower limit value of the predetermined speed range is the target rotation speed of the rotor 58. In a speed range, which exceeds the predetermined speed range, the rotor 58 maintains its rotation even when a phase lead correction control is performed to correct the phase lead amount of the power supply phase relative to the rotation phase of the rotor 58 to be relatively small. In the present embodiment, the upper limit value of the predetermined speed range is set to about 800 rpm.

In the following description, the speed range, which is lower than the predetermined speed range, that is, lower than the target rotation speed, is referred to as a first speed range. The predetermined speed range is referred to as a second speed range. The speed range higher than the predetermined speed range is referred to as a third speed range. The speed check part 73 checks the rotation speed of the rotor 58 and determines in which one of the first speed range, the second speed range and the third speed range the determined rotation speed is.

The phase lead control part 74 performs the phase lead correction control, which corrects the phase lead amount of the power supply phase relative to the rotation phase of the rotor 58 in accordance with the rotation speed of the rotor 58. The phase lead control part 74 performs the phase lead correction differently between the shift range switchover control time and the wall-hitting control time.

Specifically, in the shift range switchover control time, the phase lead control part 74 sets a relatively large phase lead amount when the rotation speed of the rotor 58 is equal to or lower than the target rotation speed and a relatively small phase lead amount when the rotation speed of the rotor 58 is higher than the target rotation speed. In the wall-hitting control time, the phase lead control part 74 sets a relatively large phase lead amount when the rotation speed of the rotor 58 is in the first speed range or the second speed range and a relatively small phase lead amount when the rotation speed of the rotor 58 is in the third speed range.

Figure 4:
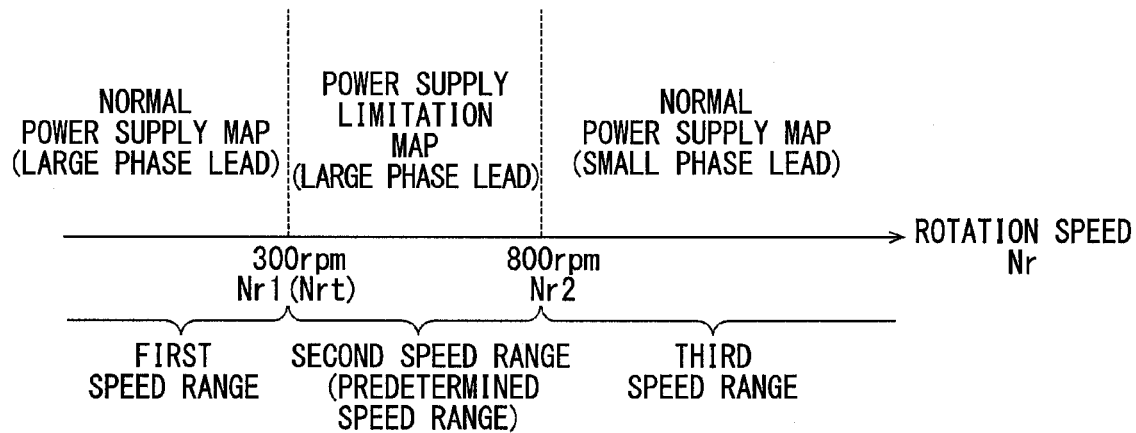
FIG. 4 is a graph showing a relation between a power supply map, which is selected by a control part of the motor control apparatus shown in FIG. 1, and a rotation speed of a rotor.

The shift range switchover control part 71 determines the power supply phase of the motor 41 by using a normal power supply map. The wall-hitting control part 72 determines the power supply phase by selectively using two power supply maps, that is, normal power supply map and power supply limitation map. The wall-hitting control part 72 uses, as shown in FIG. 4, the normal power supply map in the first speed range and the third speed range and the power supply limitation map in the second speed range.

Figures 5, 6, 7:
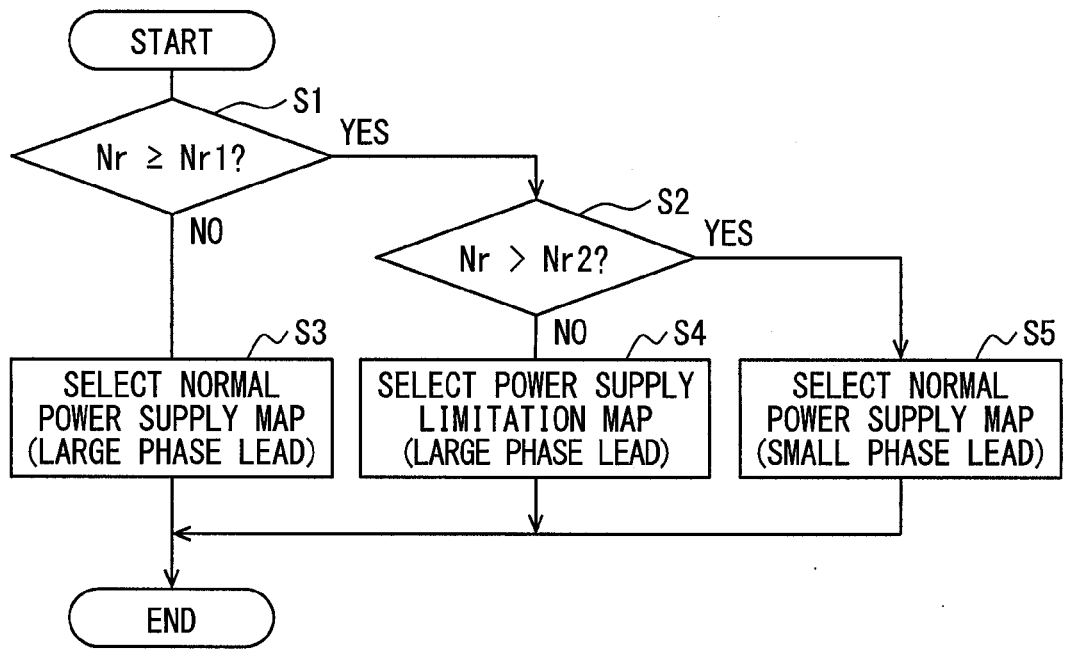
FIG. 5 is a table showing a normal power supply map, which is used by the control part of the motor control apparatus shown in FIG. 1.
FIG. 6 is a table showing a power supply limitation map, which is used by the control part of the motor control apparatus shown in FIG. 1.
FIG. 7 is a flowchart showing control processing executed by the control part of the motor control apparatus shown in FIG. 1 in performing a wall-hitting control.

In the normal power supply map shown in FIG. 5, a one-phase power supply and a two-phase power supply are switched over alternately. Specifically, when the normal power supply map is used, the power supply phase is determined so that the power supply state of the motor 41 is switched over in sequence from (A0) to (A11).

(A0) Two-phase power supply for supplying power to the V-phase coil 52 and the W-phase coil 53
(A1) Two-phase power supply for supplying power to the V-phase coil 52 and the W-phase coil 53
(A2) One-phase power supply for supplying power to the W-phase coil 53
(A3) One-phase power supply for supplying power to the W-phase coil 53
(A4) Two-phase power supply for supplying power to the U-phase coil 51 and the W-phase coil 53
(A5) Two-phase power supply for supplying power to the U-phase coil 51 and the W-phase coil 53
(A6) One-phase power supply for supplying power to the U-phase coil 51
(A7) One-phase power supply for supplying power to the U-phase coil 51
(A8) Two-phase power supply for supplying power to the U-phase coil 51 and the V-phase coil 52
(A9) Two-phase power supply for supplying power to the U-phase coil 51 and the V-phase coil 52
(A10) One-phase power supply for supplying power to the V-phase coil 52
(A11) One-phase power supply for supplying power to the V-phase coil 52

In the power supply limitation map shown in FIG. 6, the two-phase power supply and no power supply are switched over alternately. Specifically, when the power supply limitation map is used, the power supply phase is determined so that the power supply state of the motor 41 is switched over in sequence from (B0) to (B11).

(B0) Two-phase power supply to the V-phase coil 52 and the W-phase coil 53
(B1) Two-phase power supply to the V-phase coil 52 and the W-phase coil 53
(B2) No power supply
(B3) No power supply
(B4) Two-phase power supply to the U-phase coil 51 and the W-phase coil 53
(B5) Two-phase power supply to the U-phase coil 51 and the W-phase coil 53
(B6) No power supply
(B7) No power supply
(B8) Two-phase power supply to the U-phase coil 51 and the V-phase coil 52
(B9) Two-phase power supply to the U-phase coil 51 and the V-phase coil 52
(B10) No power supply
(B11) No power supply It is assumed here that an angular interval, in which the current supply pattern of the motor 41 completes one complete cycle of switchovers, is a one-cycle angular interval. It is further assumed that an angular interval, in which power is supplied to the motor 41, is a power supply angular interval. Under this assumption, the wall-hitting control part 72 limits the power supply angular interval to be smaller when the rotation speed of the rotor 58 is in the second speed range than when the rotation speed of the rotor 58 is in the first speed range and the third speed range. In the first embodiment, as clear from comparison of FIG. 5 and FIG. 6, the power supply angular interval is halved when the rotation speed of the rotor 58 is within the second speed relative to a case that the rotation speed of the rotor 58 is within the first speed range and the third speed range.

In the first embodiment, the control circuit 61 is formed of, for example, a microcontroller. The functional parts 71 to 74 are performed by software processing of a pre-stored program by a CPU of the microcontroller. Those functional parts 71 to 74 may be provided as hardware circuits of specific electronic circuits.

(Control Processing of Control Circuit)

The control circuit 61 executes control processing shown in FIG. 7 for controlling the rotation speed Nr of the rotor 58 at the time of wall-hitting control. The control processing of FIG. 7 is repeated during a period of execution of the wall-hitting processing. In the following description, the lower limit value of the second speed range (that is, target rotation speed Nrt) is referred to as a limitation lower limit speed Nr1 and the upper limit value of the second speed range is referred to as a limitation upper limit speed Nr2.

At step S1 in FIG. 7, the speed check part 73 checks whether the rotation speed Nr of the rotor 58 is equal to or higher than the limitation lower limit speed Nr1. When the rotation speed Nr of the rotor 58 is equal to or higher than the limitation lower limit speed Nr1 (S1: YES), step S2 is executed. When the rotation speed Nr of the rotor 58 is lower than the limitation lower limit speed Nr1 (S1: NO), step S3 is executed.

The speed check part 73 checks at step S2 whether the rotation speed Nr of the rotor 58 is higher than the limitation upper limit speed Nr2. When the rotation speed Nr of the rotor 58 is equal to or lower than the limitation upper limit speed Nr2 (S2: NO), step S4 is executed. When the rotation speed Nr of the rotor 58 is higher than the limitation upper limit speed Nr2 (S2: YES), step S5 is executed.

At step S3, the wall-hitting part 72 determines the power supply phase in accordance with the encoder count value by using the normal power supply map and commands the driving circuit 62 to rotate the rotor 58. After execution of step S3, the control processing shown in FIG. 7 is finished. The phase lead amount at this time is set larger than that set at step S5, which will be described later.

At step S4, the wall-hitting part 72 determines the power supply phase in accordance with the encoder count value by using the power supply limitation map and commands the driving circuit 62 to rotate the rotor 58. After execution of step S4, the control processing shown in FIG. 7 is finished. The phase lead amount at this time is set larger than that set at step S5, which will be described later.

At step S5, the wall-hitting part 72 determines the power supply phase in accordance with the encoder count value by using the normal power supply map and commands the driving circuit 62 to rotate the rotor 58. After execution of step S5, the control processing shown in FIG. 7 is finished. The phase lead amount at this time is set smaller than that set at step S4.

(Advantage)

As described above, the control circuit 61 of the motor control apparatus 33 according to the first embodiment is provided with the shift range switchover control part 71, the wall-hitting control part 72 and the speed check part 73. The shift range switchover control part 71 rotates the rotor 58 to the target position corresponding to the target shift range. The wall-hitting control part 72 rotates the rotor 58 until the detent plate 16 hits one of the limit positions of the movable range of the detent plate 16. At this time, the wall-hitting control part 72 rotates the rotor 58 at the speed lower than when the shift range switchover control part 71 rotates the rotor 58. When the rotor 58 is rotated by the wall-hitting control part 72, the speed check part 73 checks whether the rotation speed Nr of the rotor 58 is within the predetermined speed range. When the rotation speed Nr of the rotor 58 is within the predetermined speed range, the wall-hitting control part 72 limits the power supply angular interval to be smaller than when the rotation speed Nr of the rotor 58 is lower than the predetermined speed range.

In comparison to the shift range switchover time, the rotation speed Nr of the rotor 58 is decreased at the wall-hitting control time. As a result, the inertia of the rotation part between the rotor 58 and the detent plate 16 is decreased and the impact, which is generated when the detent plate 16 hits the limit position, is decreased. When the rotation speed Nr of the rotor 58 exceeds the limitation upper limit speed Nr2 at the time of rotation of the rotor 58 by the wall-hitting control part 72, the power supply angular interval is limited and the rotation speed is decelerated smoothly because of limitation to the power supply angular interval. For this reason, it is possible to suppress the rotation of the motor 41 from being stopped before the wall-hitting operation because of too large magnetic attraction force, and learn the reference position correctly. According to the motor control apparatus 33, the load applied to the rotation transfer part from the motor 41 to the detent plate 16 is reduced without lowering the accuracy of detecting the rotation position of the detent plate 16 of the shift range switchover mechanism 12.

In the first embodiment, the wall-hitting control part 72 halves the power supply angular interval when the rotation speed Nr of the rotor 58 is within the predetermined speed range in comparison to a case when the rotation speed Nr of the rotor 58 is lower than the predetermined speed range. By thus limiting the power supply interval relatively remarkably, it is more surely possible to prevent the motor 41 from stopping before the wall-hitting operation is finished.

In the first embodiment, the predetermined speed range is preset as a speed range, in which the rotation speed Nr of the rotor 58 is suppressed from varying. By limiting the power supply angular interval to be small in the predetermined speed range pre-set as described above, it is possible to maintain the rotation of the motor 41, which is against the braking force of the magnetic attraction force, until the wall-hitting control is performed.

In the first embodiment, the lower limit value of the predetermined speed range is set to the target rotation speed Nrt of the rotor 58. With this setting, when the rotation speed Nr of the rotor 58 exceeds the target rotation speed Nrt during rotation of the rotor 58 by the wall-hitting control part 72, the power supply angular interval is limited. As a result, the rotation speed Nr is smoothly decelerated toward the target rotation speed Nrt by the reaction force from the detent plate 16 side.

In the first embodiment, the speed range, which is higher than the predetermined speed range, is so set that the rotor 58 does not stop its rotation even when the phase lead correction control is performed for correcting the phase lead amount of the power supply phase to be comparatively small relative to the rotation phase of the rotor 58. When the rotation speed Nr of the rotor 58 exceeds the predetermined speed range, the wall-hitting control part 72 increases the power supply angular interval in comparison to the case that the rotation speed Nr of the rotor 58 is within the predetermined speed range. When the rotation speed Nr of the rotor 58 is increased to the speed range, in which the motor 41 can continue its rotation, the limitation of the power supply angular interval is released. As a result, the braking force generated by the magnetic attraction force is increased to speedily decelerate the rotor 58.

[Second Embodiment]

In a second embodiment, the wall-hitting control part 72 of the motor control apparatus 33 determines the power supply phase by using a power supply limitation map shown in FIG. 8. In the power supply limitation map shown in FIG. 8, no power supply and the one-phase power supply are switched over alternately. Specifically, when the power supply limitation map is used, the power supply phase is determined so that the power supply state of the motor 41 is switched over sequentially in the following order (C0) to (C11).

(C0) No power supply
(C1) No power supply
(C2) One-phase power supply to W-phase coil 53
(C3) One-phase power supply to W-phase coil 53
(C4) No power supply
(C5) No power supply
(C6) One-phase power supply to U-phase coil 51
(C7) One-phase power supply to U-phase coil 51
(C8) No power supply
(C9) No power supply
(C10) One-phase power supply to V-phase coil 52
(C11) One-phase power supply to V-phase coil 52

Thus the power supply limitation map may be set so that no power supply and one-phase power supply are switched over alternately. Even with this pattern, the power supply angular interval in the second speed range is smaller than that in the first speed range. As a result, the second embodiment also provides the similar advantage as the first embodiment.

[Third Embodiment]

In a third embodiment, the wall-hitting control part 72 of the motor control apparatus 33 determines the power supply phase by using a power supply limitation map shown in FIG. 9. In the power supply limitation map shown in FIG. 9, no power supply and the one-phase power supply are switched over alternately. Specifically, when the power supply limitation map is used, the power supply phase is determined so that the power supply state of the motor 41 is switched over sequentially in the following order (D0) to (D11).

(D0) No power supply
(D1) No power supply
(D2) No power supply
(D3) No power supply
(D4) No power supply
(D5) No power supply
(D6) One-phase power supply to U-phase coil 51
(D7) One-phase power supply to U-phase coil 51
(D8) No power supply
(D9) No power supply
(D10) No power supply
(D11) No power supply According to this switchover, the power supply angular interval in the second speed range is decreased to one-sixth of the power supply angular interval in the first speed range. According to the third embodiment, it is possible to more surely suppress the motor 41 from stopping before the completion of the wall-hitting operation than in the first embodiment.

[Fourth Embodiment]

In a fourth embodiment, the wall-hitting control part 72 of the motor control apparatus 33 determines the power supply phase by using a power supply limitation map shown in FIG. 10. In the power supply limitation map shown in FIG. 10, no power supply and the two-phase power supply are switched over alternately. Specifically, when the power supply limitation map is used, the power supply phase is determined so that the power supply state of the motor 41 is switched over sequentially in the following order (E0) to (E11).

(E0) No power supply
(E1) No power supply
(E2) No power supply
(E3) No power supply
(E4) Two-phase power supply to U-phase coil 51 and W-phase coil 53
(E5) Two-phase power supply to U-phase coil 51 and W-phase coil 53
(E6) No power supply
(E7) No power supply
(E8) No power supply
(E9) No power supply
(E10) No power supply
(E11) No power supply According to this switchover, the power supply angular interval in the second speed range is decreased to one-sixth of the power supply angular interval in the first speed range. According to the fourth embodiment, it is possible to more surely suppress the motor 41 from stopping before the completion of the wall-hitting operation than in the first embodiment.

[Fifth Embodiment]

In a fifth embodiment, the wall-hitting control part 72 of the motor control apparatus 33 determines the power supply phase by using a power supply limitation map shown in FIG. 11. In the power supply limitation map shown in FIG. 11, in all power supply angular intervals of one complete cycle of power supply, no power is supplied to the motor 41. Specifically, when the power supply limitation map shown in FIG. 11 is used, the power supply phase is determined so that the power supply state of the motor 41 is performed sequentially in the following order (F0) to (F11).

(F0) No power supply
(F1) No power supply
(F2) No power supply
(F3) No power supply
(F4) No power supply
(F5) No power supply
(F6) No power supply
(F7) No power supply
(F8) No power supply
(F9) No power supply
(F10) No power supply
(F11) No power supply That is, the wall-hitting control part 72 sets the power supply angular interval to be zero when the rotation speed Nr of the rotor 58 is within the predetermined speed range. Thus the fifth embodiment more surely prevents the motor 41 from stopping its rotation before completion of the wall-hitting operation than the third and fourth embodiments.

[Sixth Embodiment]

In a sixth embodiment, the wall-hitting control part 72 of the motor control apparatus 33 determines the power supply phase by using a power supply limitation map shown in FIG. 8. In the normal power supply map shown in FIG. 12, in all power supply angular intervals of one complete cycle of power supply, the two-phase power supply is continued.

Specifically, when the normal power supply map is used, the power supply phase is determined so that the power supply state of the motor 41 is performed sequentially in the following order (G0) to (G11).

(G0) Two-phase power supply to V-phase coil 52 and W-phase coil 53
(G1) Two-phase power supply to V-phase coil 52 and W-phase coil 53
(G2) Two-phase power supply to V-phase coil 52 and W-phase coil 53
(G3) Two-phase power supply to U-phase coil 51 and W-phase coil 53
(G4) Two-phase power supply to U-phase coil 51 and W-phase coil 53
(G5) Two-phase power supply to U-phase coil 51 and W-phase coil 53
(G6) Two-phase power supply to U-phase coil 51 and W-phase coil 53
(G7) Two-phase power supply to U-phase coil 51 and V-phase coil 52
(G8) Two-phase power supply to U-phase coil 51 and V-phase coil 52
(G9) Two-phase power supply to U-phase coil 51 and V-phase coil 52
(G10) Two-phase power supply to U-phase coil 51 and V-phase coil 52
(G11) Two-phase power supply to V-phase coil 52 and W-phase coil 53

Thus the power supply to the motor 41 may only be the two-phase power supply. Even with this switchover, the power supply angular interval in the second speed range is decreased to be one-half of the power supply angular interval in the first speed range. The sixth embodiment thus provides the similar advantage as the first embodiment.

[Seventh Embodiment]

In a seventh embodiment, the wall-hitting control part 72 of the motor control apparatus 33 determines the power supply phase of the motor 41 by selectively using the normal power supply map shown in FIG. 12 and the power supply limitation map shown in FIG. 10. According to this switchover, the power supply angular interval in the second speed range is decreased to be one-sixth of the power supply angular interval in the first speed range. According to the seventh embodiment, it is possible to more surely suppress the motor 41 from stopping its rotation before the completion of the wall-hitting operation than in the sixth embodiment.

[Eighth Embodiment]

In an eighth embodiment, the wall-hitting control part 72 of the motor control apparatus 33 determines the power supply phase of the motor 41 by selectively using the normal power supply map shown in FIG. 12 and the power supply limitation map shown in FIG. 11. In this case of the power supply limitation map shown in FIG. 11, the power supply angular interval in the second speed range is zero. According to the eighth embodiment, it is possible to more surely suppress the motor 41 from stopping its rotation before the completion of the wall-hitting operation than in the seventh embodiment.

[Ninth Embodiment]

In a ninth embodiment, the wall-hitting control part 72 of the motor control apparatus 33 determines the power supply phase by selectively using a normal power supply map shown in FIG. 13 and the power supply limitation map shown in FIG. 8. In the normal power supply map shown in FIG. 13, in all power supply angular intervals of one complete cycle of power supply, the one-phase power supply is continued. Specifically, when the normal power supply map is used, the power supply phase is determined so that the power supply state of the motor 41 is performed sequentially in the following order (H0) to (H11).

(H0) One-phase power supply to V-phase coil 52
(H1) One-phase power supply to W-phase coil 53
(H2) One-phase power supply to W-phase coil 53
(H3) One-phase power supply to W-phase coil 53
(H4) One-phase power supply to W-phase coil 53
(H5) One-phase power supply to U-phase coil 51
(H6) One-phase power supply to U-phase coil 51
(H7) One-phase power supply to U-phase coil 51
(H8) One-phase power supply to U-phase coil 51
(H9) One-phase power supply to V-phase coil 52
(H10) One-phase power supply to V-phase coil 52
(H11) One-phase power supply to V-phase coil 52

Thus, the motor 41 may be supplied with power in only one-phase power supply pattern. Even with this switchover operation, the power supply angular interval in the second speed range is decreased to be one-half of the power supply angular interval in the first speed range. The ninth embodiment thus provides the same advantage as the first embodiment.

[Tenth Embodiment]

In a tenth embodiment, the wall-hitting control part 72 of the motor control apparatus 33 determines the power supply phase by selectively using the normal power supply map shown in FIG. 13 and the power supply limitation map shown in FIG. 9. According to this switchover, the power supply angular interval in the second speed range is decreased to be one-sixth of the power supply angular interval in the first speed range. According to the tenth embodiment, it is possible to more surely suppress the motor 41 from stopping its rotation before the completion of the wall-hitting operation than in the ninth embodiment.

[Eleventh Embodiment]

In an eleventh embodiment, the wall-hitting control part 72 of the motor control apparatus 33 determines the power supply phase by selectively using the normal power supply map shown in FIG. 13 and the power supply limitation map shown in FIG. 11. With this power supply switchover, the power supply angular interval in the second speed range is zero. According to the eleventh embodiment, it is possible to more surely suppress the motor 41 from stopping its rotation before the completion of the wall-hitting operation than in the tenth embodiment.

[Other Embodiment]

As the other embodiment of the motor control apparatus 33, the following modifications may be made.

The power supply angular interval in the second speed range may be larger than one-half of the power supply angular interval in the first speed range. Even in this case, as far as the power supply angular interval in the second speed range is smaller than the power supply angular interval in the first speed range, it is still possible to suppress the rotation of the motor 41 from stopping before the wall-hitting is completed.

The power supply angular interval in the third speed range may be different from that in the first speed range.

The second speed range need not have the upper limit thereby to have no third speed range.

The number of power supply patterns in one complete cycle of angular interval is not limited to twelve patterns but may be other than twelve patterns, for example, six patterns.

The motor may be a synchronous motor other than a switched reluctance motor.

The encoder may be other than a magnetic type and may output three or more signals.

The shift manipulation device may be configured with switches, for example, in place of a shift lever.

The motor control apparatus is not limited to the embodiments and modifications described above but may be implemented as more different embodiments.

What is claimed is:

1. A motor control apparatus for rotationally driving a driven body of a shift range switchover mechanism by controlling a motor provided as a drive power source of a shift-by-wire system, the motor control apparatus comprising:
   a shift range switchover control part for rotationally driving a rotor of the motor to a target position, which corresponds to a target shift range;
   a wall-hitting control part for rotating the rotor until the driven body hits one of limit positions of a movable range of the driven body at a speed lower than that of the rotor controlled by the shift range switchover control part; and
   a speed check part for checking whether a rotation speed of the rotor is within a predetermined speed range, when the rotor is rotated by the wall-hitting control part,
   wherein the wall-hitting control part limits a power supply angular interval to be smaller when the rotation speed of the rotor is within the predetermined speed range than when the rotation speed of the rotor is lower than the predetermined speed range, the power supply angular interval being an angular interval of power supply to the motor in one complete cycle of power supply patterns performed to rotate the rotor.

2. The motor control apparatus according to claim 1, wherein:
   the wall-hitting control part decreases the power supply angular interval to be smaller than one-half when the rotation speed of the rotor is within the predetermined speed range than when the rotation speed of the rotor is lower than the predetermined speed range.

3. The motor control apparatus according to claim 1, wherein:
   the wall-hitting control part sets the power supply angular interval to when the rotation speed of the rotor is within the predetermined speed range.

4. The motor control apparatus according to claim 1, wherein:
   the predetermined speed range is preset as a speed range, in which a variation in the rotation speed of the rotor need be suppressed.

5. The motor control apparatus according claim 1, wherein:
   a lower limit of the predetermined speed range is set to the target rotation speed of the rotor.

6. The motor control apparatus according to claim 1, wherein:
   the predetermined speed range is set so that the rotor continues rotation in a speed range higher than the predetermined speed range, even when a phase lead amount of a power supply phase relative to a rotation phase of the rotor is corrected relatively small by a phase lead correction control; and
   the wall-hitting control part increases the power supply angular interval when the rotation speed of the rotor is higher than the predetermined speed range than when the rotation speed of the rotor is within the predetermined speed range.

7. The motor control apparatus according to claim 1, wherein:
   the shift range switchover control part performs a shift range switchover control for rotationally driving the rotor to the target position,
   the wall-hitting control part performs a wall-hitting control for rotating the rotor until the driven body hits one of the limit positions, and
   the wall-hitting control part performs the wall-hitting control when the shift range switchover control part has stopped performing the shift range switchover control.

8. The motor control apparatus according to claim 7, wherein:
   the wall-hitting control part performs the wall-hitting control and learns the rotation position of the rotor as a reference position when the rotor stops its rotation.

9. The motor control apparatus according to claim 1, wherein:
   each of the limit positions of the movable range is different from the target position.

10. The motor control apparatus according to claim 9, wherein:
    the driven body has a recess part on an outer peripheral part, and the recess corresponds to the target position.

11. The motor control apparatus according to claim 1, wherein:
    the wall-hitting control part rotates the rotor at the speed lower than a speed at which the shift range switchover control part rotates the rotor to the target position.

12. The motor control apparatus according to claim 1, wherein:
    the wall-hitting control part supplies power to the motor in the power supply angular interval.

13. The motor control apparatus according to claim 12, wherein:
    the wall-hitting control part limits power supply by stopping power to the motor in an angular interval other than the power supply angular interval in the one complete cycle.

14. A motor control apparatus for rotationally driving a driven body of a shift range switchover mechanism by controlling a motor provided as a drive power source of a shift-by-wire system, the motor control apparatus comprising:
    a shift range switchover control part for rotationally driving a rotor of the motor to a target position, which corresponds to a target shift range;
    a wall-hitting control part for rotating the rotor until the driven body hits one of limit positions of a movable range of the driven body at a speed lower than that of the rotor controlled by the shift range switchover control part; and
    a speed check part for checking whether a rotation speed of the rotor is within a predetermined speed range, when the rotor is rotated by the wall-hitting control part,
    wherein the wall-hitting control part limits a power supply angular interval to be smaller when the rotation speed of the rotor is within the predetermined speed range than when the rotation speed of the rotor is lower than the predetermined speed range,
    the wall-hitting control part supplies power to the motor in the power supply angular interval in one complete cycle of power supply patterns performed to rotate the rotor, and the wall-hitting control part stops supply of power to the motor in an angular interval other than the power supply angular interval in the one complete cycle.

15. The motor control apparatus of claim 14, wherein:
the wall-hitting control part alternately and repeatedly switches between (i) providing power supply to the motor in the power supply angular interval in the one complete cycle and (ii) stopping power supply to the motor in the angular interval other than the power supply interval in the one complete cycle.

* * * * *